(12) United States Patent
Moskwa et al.

(10) Patent No.: US 7,669,535 B2
(45) Date of Patent: Mar. 2, 2010

(54) BOILER GAS FLOW DISTRIBUTION FIN APPARATUS AND METHOD

(75) Inventors: Kenneth R. Moskwa, Valparaiso, IN (US); Jeff Jelinek, Hammond, IN (US); Ryan Hardesty, Chesterton, IN (US); Fred Hoffmaster, LaPorte, IN (US)

(73) Assignee: The Marley-Wylain Company, Michigan City, IN (US)

( * ) Notice: Subject to any disclaimer, the term of this patent is extended or adjusted under 35 U.S.C. 154(b) by 356 days.

(21) Appl. No.: 11/117,519

(22) Filed: Apr. 29, 2005

(65) Prior Publication Data

US 2006/0243224 A1     Nov. 2, 2006

(51) Int. Cl.
    *F23M 9/00*     (2006.01)
(52) U.S. Cl. ................................. 110/322; 122/135.1
(58) Field of Classification Search ................. 110/322, 110/147, 182.5, 162, 163, 207, 309, 310, 110/314; 165/9.3, DIG. 32, DIG. 33; 432/176, 432/181; 237/53; 122/135.1
See application file for complete search history.

(56) References Cited

U.S. PATENT DOCUMENTS

| 1,747,855 | A | * | 2/1930 | Bradley | 122/135.1 |
| 2,546,082 | A | * | 3/1951 | Andersen | 122/135.1 |
| 2,813,708 | A | * | 11/1957 | Frey | 165/9.3 |
| 4,256,173 | A | * | 3/1981 | Tsai et al. | 165/9.3 |

* cited by examiner

*Primary Examiner*—Kenneth B Rinehart
(74) *Attorney, Agent, or Firm*—Baker & Hostetler LLP

(57) ABSTRACT

A boiler gas flow distribution fin includes an elongated flow distribution fin protruding from a back wall of a flow distribution channel into a hot gas flow path from a boiler combustion chamber. The flow distribution fin can include a leading segment with a leading ridge, a medial segment with a medial ridge, and a trailing segment with a trailing ridge. A gap between the fin ridges and a set of convective fins in an adjacent flue passageway segment can vary from a larger gap at the leading ridge to a smaller gap at the trailing ridge, transitioning along the medial ridge. The flow distribution fin can aid in directing a hot gas flow from a combustion chamber into the flue passageway segment, resulting in a substantially balanced mass flow rate through each of a series of flue passageway sections.

20 Claims, 3 Drawing Sheets

BOILER GAS FLOW DISTRIBUTION FIN APPARATUS AND METHOD

FIELD OF THE INVENTION

The present invention relates generally to fuel-burning combustion devices. More particularly, the present invention relates to boiler combustion gas flow distribution.

BACKGROUND OF THE INVENTION

Domestic boilers are used to generate hot water, which may be used to flow through a circuit to provide heating to a facility, such as a home or office building. The hot water also may be stored in a hot water tank and used for hot water needs, such as running a dishwasher, shower and other domestic hot water uses.

Fuel-burning boilers commonly include a fuel-burning combustion device, or burner, to provide a source of heat to heat liquid water or steam. The burner may supply a hot gas mixture, which can be routed through a series of flue passageways. A boiler may further include two or more flue sections designed to transfer heat by way of convection from the hot gas mixture to liquid water or steam. The flue section typically can include one or more convective flue passageways through which the hot gas mixture can flow. In some boilers, the hot gas mixture can be routed through a sequence of flue passageways, each of which can be comprised of a series of flue passageway segments in a series of flue sections.

Additionally, the hot gas mixture can be routed in different directions through the flue passageway—for example, the hot gas mixture can be routed in one direction through a first flue passageway, and then in the opposite direction through a second flue passageway that runs parallel to the first, and so on, through a sequence of multiple flue passageways in the flue sections.

Generally, the flue sections of a boiler also include water passageways that are separated from the flue passageways by a solid wall, for example, produced from cast iron. The water passageway in the individual flue sections can be interconnected in order to permit liquid water or steam in the water passageways to flow between the flue sections, as well.

Furthermore, the flue passageways can include a series of convective fins attached to or formed from the solid wall and configured to extend into the flow stream of the hot gas mixture in order to transfer heat from the hot gases to the fins, and subsequently to the liquid water or steam on the opposite side of the wall in the water passageways.

Thus, hot gases from the burner can be routed to the first flue passageway segment of the boiler, where the hot gases pass over a set of convective fins around the perimeter of the flue passageway segment in order to transfer heat to the liquid water or steam in the water passageways. Thus, the flue passageway flow path is effectively divided into discrete sections by the convective fins.

In some boiler configurations, the combustion gases can travel along a combustion chamber wall and into one or more gas flow distribution channels, from which the combustion gases may the first flue passageway segment at a right angle to the flow direction of the flow distribution channel. In some boiler configurations, it has been shown that a disproportionately high portion of the hot gas mass flow travels to a far end of the gas flow distribution channel or channels, and into a last section of the flue passageway between an uppermost pair of convective fins and a far wall of the flue passageway.

Accordingly, it is desirable to provide a method and apparatus that more evenly distributes the hot gas flow through all of the flue passageway sections.

SUMMARY OF THE INVENTION

The foregoing needs are met, to a great extent, by the present invention, wherein in one aspect an apparatus is provided that in some embodiments substantially balances the hot gas flow distribution among the series of sections in a flue passageway.

In accordance with one aspect of the present invention, a hot gas flow distribution channel for a boiler can include a channel configured to convey a hot gas and an elongated flow distribution fin. The flow distribution fin can be longitudinally aligned along a length of the channel and orthogonally oriented with respect to a series of convective fins that are associated with an adjacent flue passageway segment.

In accordance with another aspect of the present invention, a hot gas flow distribution channel for a boiler can include means for conveying a hot gas, as well as means for substantially balancing a gas flow distribution among a plurality of flue passageway sections.

In accordance with yet another aspect of the present invention, a method of substantially balancing a gas flow distribution among a plurality of flue passageway sections in a boiler can include the steps of conveying a gas flow stream and directing a portion of the gas flow stream toward a flue passageway segment.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
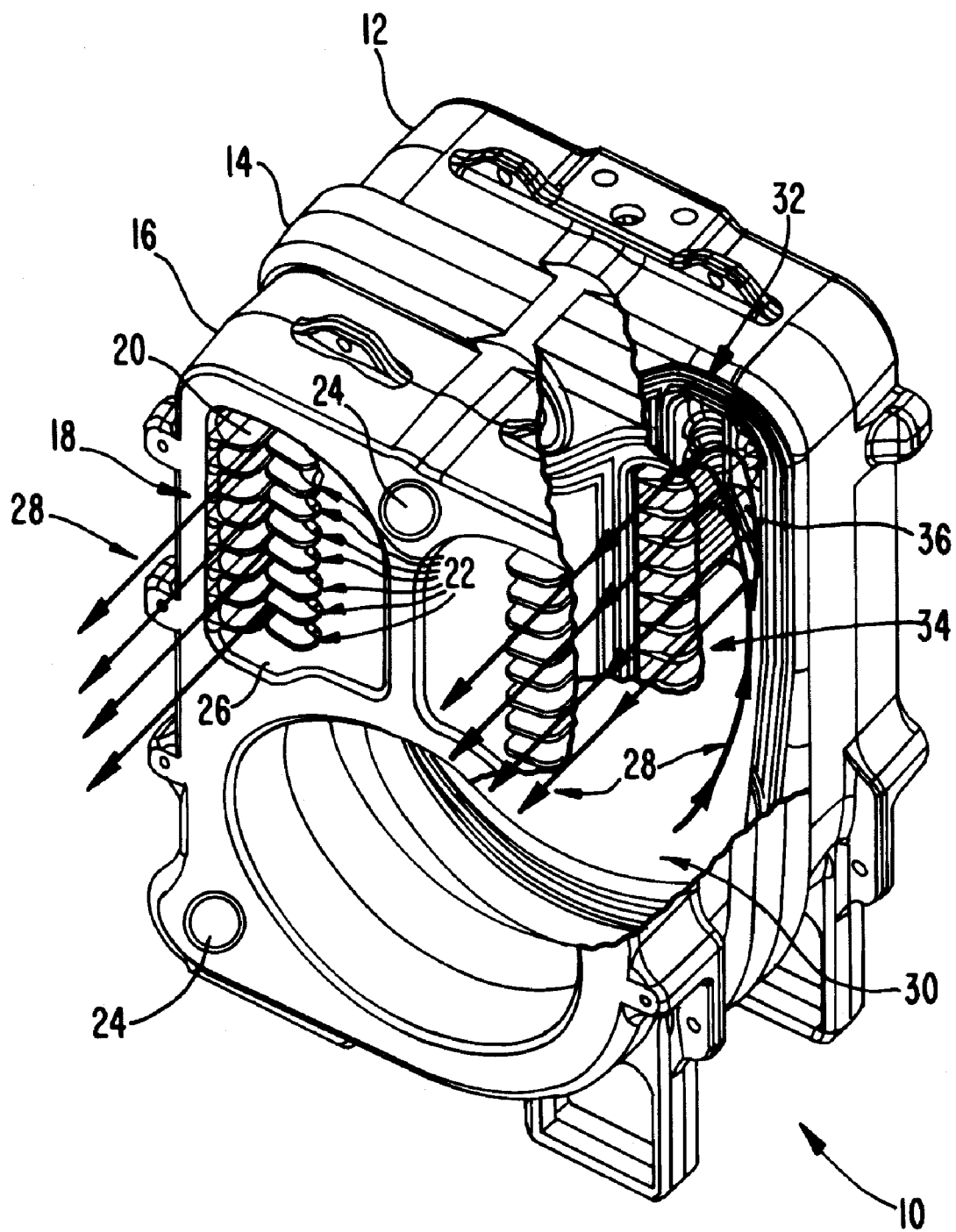
FIG. 1 is a partially cut away perspective view illustrating a boiler subassembly with a gas flow distribution fin according to a preferred embodiment of the invention.

An embodiment in accordance with the present invention can provide a gas flow distribution fin longitudinally aligned along the length of a gas distribution channel. The flow distribution fin can have a variable width gap between a ridge or apex of the fin and a series of convective fins in an adjacent flue passageway segment. The flow distribution fin can aid in directing a hot gas flow from a combustion chamber of a boiler into a series of flue passageway sections divided by the convection fins around the perimeter of a boiler flue passageway.

The flow distribution fin can have the advantage that the hot gas flow is distributed more evenly, or in a substantially balanced fashion, among the flue passageway sections. The invention will now be described with reference to the drawing figures, in which like reference numerals refer to like parts throughout.

An embodiment in accordance with the present inventive apparatus and method is illustrated in FIG. 1, which shows a boiler subassembly 10, including a first end flue section 12, an intermediate flue section 14 and a second end flue section 16. In some embodiments of the invention, there may be two, three, four, five or more intermediate flue sections, or no intermediate flue sections, depending on the needs of the boiler requirements. Each of the flue sections can include one or more flue passageway segments, such as the representative flue passageway segment 18 shown in FIG. 1, which includes a set of convective fins 20 around the periphery of the wall of the flue passageway segment 18. The convective fins 20 can effectively divide the flue passageway segment 18 into a series of flue passageway sections 22. The flue sections 12, 14, 16 can also include water passageways 24 on the opposite side of the flue passageway walls 26.

In operation, hot gases, or a hot gas flow stream, represented by arrows 28 can be conveyed from a combustion chamber 30 upward through a gas flow distribution channel 32, and then forward through a series of flue passageway segments 18, including an intermediate flue passageway segment 34 that is adjacent to the flow distribution channel 32, as shown in the partial cutaway portion of FIG. 1. An elongated gas flow distribution fin 36 can be included in the flow path of the flow distribution channel 32 to aid in directing the hot gas flow stream 28 to transition from the combustion chamber 30 through the flow distribution channel 32 and into the intermediate flue passageway segment 34.

Figure 2:
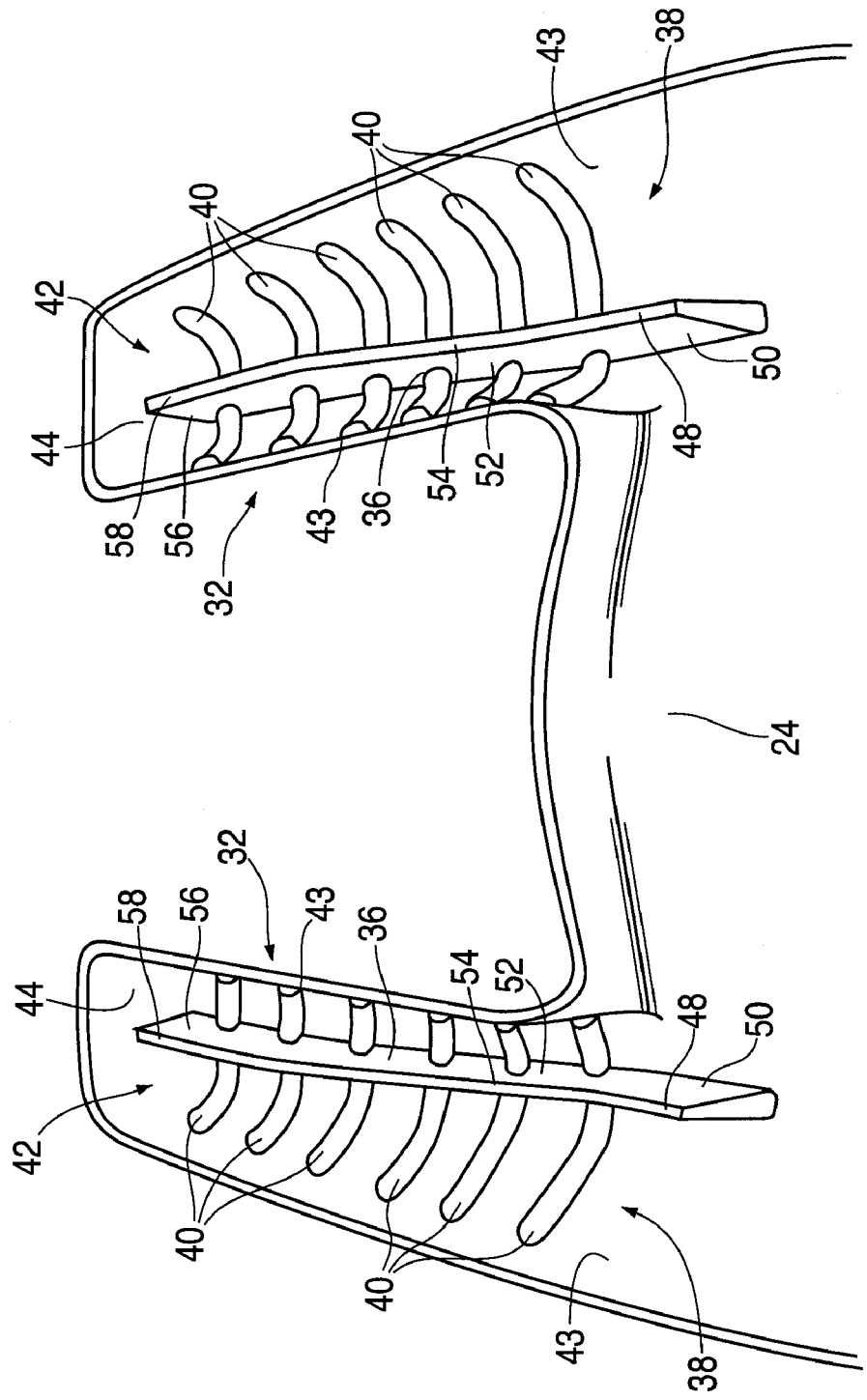
FIG. 2 is a frontal perspective view of a pair of flow distribution fins in two flow distribution channels extending from a boiler combustion chamber.

FIG. 2 illustrates a pair of gas flow distribution channels 32. Hot gases 28 from the combustion chamber 30 flow into the flow distribution channel 32 through an entry cross section 38 of the flow distribution channel 32. Each flow distribution channel 32 can include a flow distribution fin 36. In addition, each of the flow distribution channels 32 can include a series of convective ribs 40 at longitudinal intervals protruding around the periphery of the flow distribution channels 32.

In some boiler configurations—in particular, those that have a constant cross-sectional area flow distribution channel—the hot gas flow stream 28 can tend to stagnate as the hot gases 28 approach the far, or upper, end of the flow distribution channel 32. In this case, the hot gases 28 can recirculate in an upper back corner areas of the flow distribution channels 32, reducing the effective cross-sectional flow area of the flow distribution channels 32 and interfering with the distribution of the hot gases 28.

In order to reduce this undesirable effect, the flow distribution channels 32 can be configured to reduce flow stagnation and recirculation. For example, the flow distribution channels 32 can include a tapered cross-sectional area that is relatively large at the entry cross section 38 and decreases toward a relatively small upper, or distal, end cross section 42. Thus, in a preferred embodiment of the invention, the depth of the side walls 43 of the flow distribution channel 32 diminishes from the entry cross section 38 to the upper cross section 42.

The flow distribution channel 32 shown in FIG. 2, which includes a continuously-tapered channel cross section from the entry cross section 38 to the upper cross section 42, permits the hot gas flow stream 28 to travel upward through the flow distribution channels 32 at a higher velocity than that achieved in some other configurations, because the gas flow is not constricted or inhibited by a stagnation or recirculation zone. Thus, the gas flow stream 28 can follow a contour of a back wall 44 of the flow distribution channels 32 as the hot gases 28 flow upward through the flow distribution channel 32, which can increase the heat transfer efficiency of the boiler.

In the embodiment shown in FIG. 2, the flow distribution channel cross section continuously decreases from the entry cross section 38 upward through the flow distribution channel 32 to the upper cross section 42. However, in other embodiments, the channel cross section can decrease in a discontinuous pattern, or along a part of the length of the flow distribution channel 32.

In addition, the flow distribution fin 36 can improve the flow characteristics of the flow distribution channel 32. The flow distribution fin 36 can be aligned substantially parallel to the longitudinal centerline of the flow distribution channel 32, effectively dividing the flow distribution channel 32 flow path into two or more partial flow paths, increasing the velocity and mass flow rate of the hot gas flow stream 28 parallel to the longitudinal centerline of the flow distribution channel 32, and obstructing gas flow that is not parallel to the longitudinal centerline of the flow distribution channel 32. Furthermore, the flow distribution fin 36 can be relatively thin compared to the size of the flow distribution channel 32, in order not to excessively obstruct the flow path of the flow distribution channel 32.

Moreover, the flow distribution fin 36 can be configured so that a leading ridge 48 is located at a greater distance from the convective fins 20, or the interface with the adjacent intermediate flue passageway segment 34 (see FIG. 1) than the distance from a trailing ridge 50 to the intermediate flue passageway segment 34. As a result, some of the hot gases 28 flowing from the combustion chamber 30 can impinge the leading segment 50 of the flow distribution fin 36 and can be deflected upward toward the intermediate flue passageway segment 34 (see FIG. 1). In this way a greater proportion of the hot gas flow stream 28 enters into the initial, or lower, sections 22 (see FIG. 1) of the intermediate flue passageway segment 34, as compared to a configuration without the flow distribution fin 36.

In addition, a medial segment 52 of the flow distribution fin 36 can include a medial ridge 54 that is sloped, so that as the hot gases 28 flow upward through the flow distribution channel 32, the distance from the medial ridge 54 to the convective fins 20 of the intermediate flue passageway segment 34 can continuously diminish. Thus, as the hot gases 28 flow upward through the flow distribution channel 32, the flow distribution fin 36 can continue to deflect a portion of the hot gases 28 toward the intermediate flue passageway segment 34.

Furthermore, a trailing segment 56 of the flow distribution fin 36 can include a trailing ridge 50 that is relatively close to the convective fins 20 of the intermediate flue passageway segment 34 (see FIG. 1), in order to deflect the remaining gas flow stream 28 toward the final sections 22 of the intermediate flue passageway segment 34. Thus, by virtue of the variable distance between the flow distribution fin 36 and the intermediate flue passageway segment 34 along the length of the flow distribution fin 36, a portion of the hot gases 28 can be directed into each of the sections 22 between the convective fins 20 of the intermediate flue segment 34, such that a relatively even proportion of the hot gas flow stream 28 enters each section 22 of the intermediate flue passageway segment 34.

Although the embodiment shown in FIG. 2 includes a single flow distribution fin 36 in each flow distribution channel 32, alternative embodiments can include more than one flow distribution fin 36 in each flow distribution channel 32. For example, an embodiment can include two flow distribution fins 36 in a single flow distribution channel 32.

Figure 3:
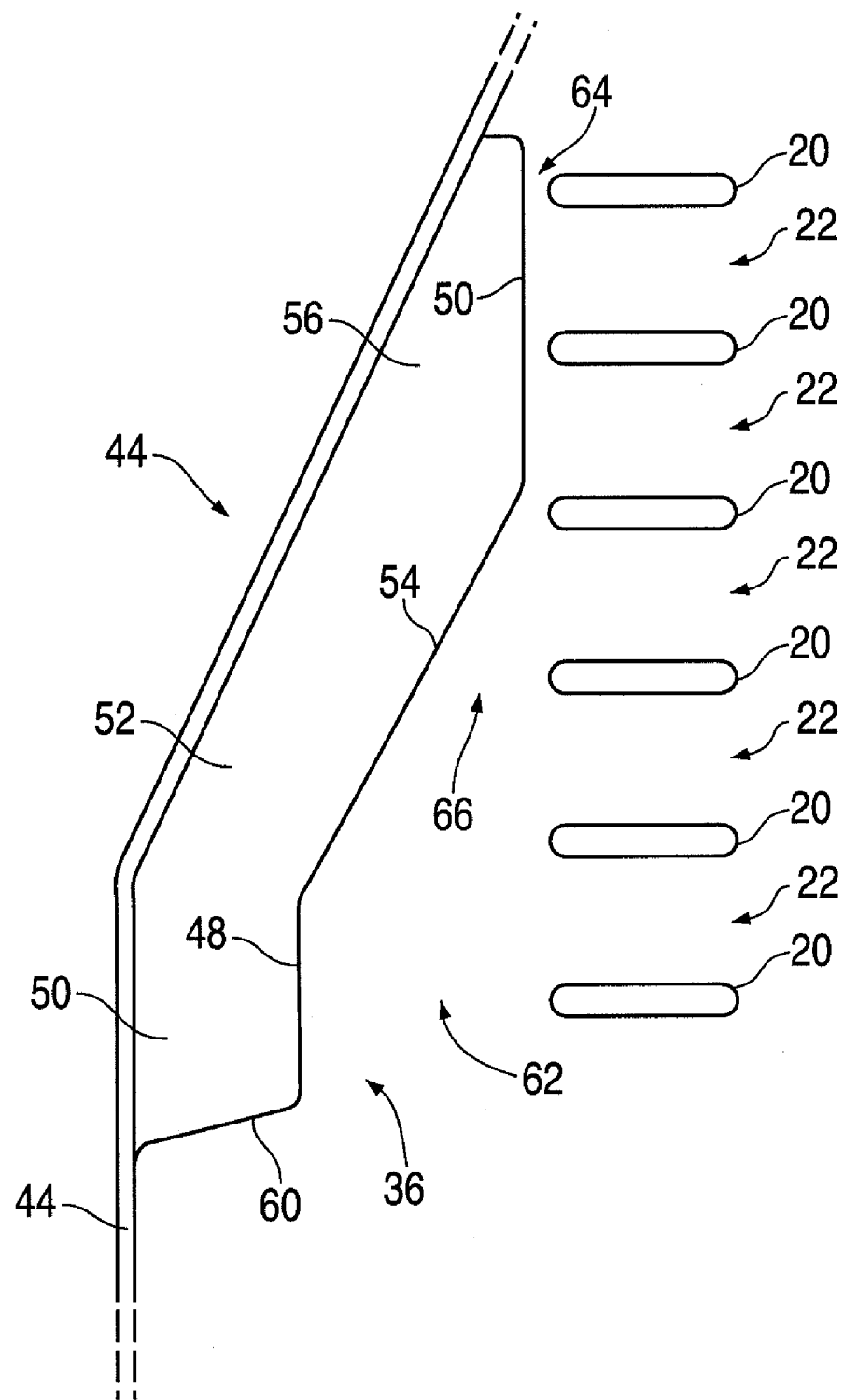
FIG. 3 is a side view of a flow distribution fin, such as those shown in FIG. 2.

FIG. 3 illustrates a flow distribution fin 36 from a side view. The flow distribution fin 36 can protrude from the back wall 44 of the flow distribution channel 32 (see FIG. 2). In addition, the back wall 44 can be sloped, as shown in FIG. 3. As described above, the flow distribution fin 36 can have a leading segment 50, a medial segment 52 and a trailing segment 56. At its apex, the flow distribution fin 36 can have a corresponding leading ridge 48, medial ridge 54, and trailing ridge 50.

The convective fins 22 and the corresponding flue passageway sections 22 of the intermediate flue passageway segment 34 (see FIG. 1) can be forward (to the right in FIG. 3) of the flow distribution fin 36. In addition, the flow distribution fin 36 has a leading edge 60, which can be swept back from the point where the leading edge 60 meets the back wall 44 to the point where the leading edge 60 meets the leading ridge 48. Nevertheless, in an alternative embodiment, the leading edge 60 of the flow distribution fin 36 can be horizontal. In other embodiments, the leading edge 60 can form any angle, acute or obtuse, with the back wall 44.

As further described above, the flow distribution fin 36 can be configured such that the leading ridge 48 is further away from the convective fins 20 than is the trailing ridge 58. Thus, a relatively large gap 62 can exist between the leading ridge 48 and the initial convective fins 20, and a relatively small gap 64 can exist between the trailing ridge 50 and the upper convective fin 20. Along the medial ridge 54, in a transitional area between the leading ridge 48 and the trailing ridge 50, the gap 66 between the medial ridge 54 and the corresponding convective fins 20 can vary from a larger gap near the leading ridge 48 to a smaller gap near the trailing ridge 50.

In operation, a portion of the hot gases 28 (see FIG. 1) flowing from the combustion chamber 30 into the flow distribution channel 32 (see FIG. 2) can be deflected by the leading segment 60 of the flow distribution fin 36 toward the lower sections 22 of the intermediate flue passageway segment 34 (see FIG. 1). As the hot gases 28 travel upward along the flow distribution fin 36, and the gap 66 between the flow distribution fin 36 and the corresponding convection fins 20 diminishes, an additional portion of the hot gases 28 can be deflected by the medial segment 52 toward the middle sections 22 of the intermediate flue passageway segment 34. Similarly, as the hot gases 28 approach the trailing segment 56 of the flow distribution fin 36, where the gap 64 between the flow distribution fin 36 and the corresponding convection fins 20 reaches a minimum, the remaining hot gases 28 are directed into the uppermost sections 22 of the intermediate flue passageway segment 34.

In this way, the flow distribution among the sections 22 of the intermediate flue passageway segment 34 is relatively balanced as compared to a baseline gas flow distribution without the flow distribution fin 36, so that an approximately equal mass flow of the hot gases 28 enters into each of the sections 22 of the flue passageway segment 34. As a result, because the overall mass flow rate is reduced near the upper sections 22, the stagnation and recirculation of the hot gases 28 near the upper end of the flow distribution channel 32 is reduced. Furthermore, the velocity of the hot gas flow stream 28 in the flow distribution channel 32 is generally increased, resulting in more efficient heat transfer.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A hot gas flow distribution channel for a boiler, comprising:
   a channel, having a contoured back wall and a non-uniform cross-sectional area, configured to convey a hot gas; and
   an elongated flow distribution fin longitudinally aligned along a length of the channel and orthogonally oriented with respect to a series of convective fins associated with an adjacent flue passageway segment, the convective fins transferring heat from the hot gas to water passageways disposed behind walls of the adjacent flue passageway segment.

2. The hot gas flow distribution channel of claim 1, wherein the flow distribution fin protrudes from a channel wall and extends into a channel flow path and divides at least a portion of the channel flow path into a plurality of partial flow paths.

3. The hot gas flow distribution channel of claim 1, wherein the flow distribution fin includes a leading segment with a leading ridge that defines a leading gap between the series of convective fins and the leading ridge.

4. The hot gas flow distribution channel of claim 3, wherein the flow distribution fin further includes a trailing segment with a trailing ridge that defines a trailing gap between the series of convective fins and the trailing ridge, the trailing gap being less than the leading gap.

5. The hot gas flow distribution channel of claim 4, wherein the flow distribution fin further includes a medial segment with a medial ridge that defines a medial gap between the series of convective fins and the medial ridge, the medial gap being less than the leading gap and greater than the trailing gap.

6. The hot gas flow distribution channel of claim 4, wherein the flow distribution fin further includes a medial segment with a medial ridge that defines a medial gap between the series of convective fins and the medial ridge, the medial gap transitioning from a first distance where the medial segment meets the leading segment to a second distance where the medial segment meets the trailing segment, the first distance being equal to the leading gap and the second distance being equal to the trailing gap.

7. The hot gas flow distribution channel of claim 1, wherein the flow distribution fin includes a thickness that is relatively thin compared to a corresponding dimension of the channel.

8. The hot gas flow distribution channel of claim 1, wherein the flow distribution fin includes a leading edge that is swept back from a base of the leading edge to the leading ridge.

9. The hot gas flow distribution channel of claim 1, wherein the flow distribution fin is configured to direct a portion of a gas flow stream toward the adjacent flue passageway segment.

10. The hot gas flow distribution channel of claim 1, further comprising:
an entry cross section; and
a distal cross section that has a smaller cross-sectional area than that of the entry cross section.

11. The hot gas flow distribution channel of claim 10, wherein the channel cross-sectional area decreases along a longitudinal centerline of the channel between the entry cross section and the distal cross section.

12. The hot gas flow distribution channel of claim 10, wherein a channel cross-sectional area continuously decreases along a longitudinal centerline of the channel from the entry cross section to the distal cross section.

13. The hot gas flow distribution channel of claim 1, wherein the contoured back wall reduces flow separation and recirculation in the channel.

14. The hot gas flow distribution channel of claim 1, further comprising a series of convection ribs around at least a partial periphery of the channel at longitudinal intervals along the channel.

15. The hot gas flow distribution channel of claim 1, further comprising a contoured combustion chamber wall configured to convey combustion gases into an entry of the channel.

16. A method of substantially balancing a gas flow distribution among a plurality of flue passageway sections in a boiler, comprising the steps of:
conveying a gas flow stream along a hot gas flow distribution channel that has a contoured back wall and a non-uniform cross-sectional area;
providing an elongated flow distribution fin longitudinally aligned along a length of the hot gas flow distribution channel and orthogonally oriented with respect to a series of convective fins associated with an adjacent flue passageway segment, the convective fins transferring heat from the gas flow stream to water passageways disposed behind walls of the adjacent flue passageway segment; and
directing a portion of the gas flow stream toward the adjacent flue passageway segment.

17. The method of claim 16, further comprising the step of dividing at least a portion of a channel flow path into a plurality of partial flow paths.

18. The method of claim 16, further comprising the step of increasing a gas flow velocity in a direction that is approximately parallel to a longitudinal centerline of a hot gas flow distribution channel.

19. The method of claim 16, further comprising the step of reducing flow stagnation and recirculation in a hot gas flow distribution channel.

20. The hot gas flow distribution channel of claim 1, wherein the flow distribution fin is aligned substantially parallel to the longitudinal centerline of the channel, and is disposed substantially along the entire length of the channel.

* * * * *